(12) United States Patent
Zimmermann et al.

(10) Patent No.: US 6,243,837 B1
(45) Date of Patent: Jun. 5, 2001

(54) MICROCOMPUTER WITH THE CAPABILITY OF SUPPRESSING SIGNALS WHICH RESET A WATCHDOG-TIMER

(75) Inventors: Jürgen Zimmermann, Vaihingen; Walter Grote, Markgröningen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/397,157

(22) PCT Filed: Sep. 10, 1994

(86) PCT No.: PCT/DE94/01043

§ 371 Date: Mar. 3, 1995

§ 102(e) Date: Mar. 3, 1995

(87) PCT Pub. No.: WO95/08802

PCT Pub. Date: Mar. 30, 1995

(30) Foreign Application Priority Data

Sep. 25, 1993 (DE) .................................................. 43 32 769

(51) Int. Cl.[7] ...................................................... G06F 11/00
(52) U.S. Cl. ................................................. 714/51; 714/55
(58) Field of Search ..................... 395/185.04, 185.08; 371/57.1, 57.2, 60, 62

(56) References Cited

U.S. PATENT DOCUMENTS

| | | | |
|---|---|---|---|
| 4,956,807 | * | 9/1990 | Hosaka et al. .................. 395/185.08 |
| 5,036,493 | * | 7/1991 | Nielsen ............................ 365/230.03 |
| 5,068,783 | * | 11/1991 | Tanagawa et al. .............. 395/183.03 |
| 5,119,381 | * | 6/1992 | Yamamoto ............................... 371/62 |
| 5,408,645 | * | 4/1995 | Ikeda et al. ..................... 395/185.08 |
| 5,521,880 | * | 5/1996 | McClure ........................... 365/233.5 |

FOREIGN PATENT DOCUMENTS

| | | | |
|---|---|---|---|
| 0551870A2 | * | 7/1993 | (EP) . |
| 2177241A | * | 1/1987 | (GB) . |
| 5-274216 | * | 10/1993 | (JP) . |

OTHER PUBLICATIONS

Motorola Semiconductor Technical Data, 1992, MC 68 F333, pp. 3–7, 28–30, 100–102 and 110.

* cited by examiner

*Primary Examiner*—Ly V. Hua
(74) *Attorney, Agent, or Firm*—Michael J. Striker

(57) ABSTRACT

A microcomputer (10) is proposed, which includes a central processing unit (11), a non-volatile memory (13), a volatile memory (14), a monitoring circuit (12) and also an input/output unit (16). Two different operating states are possible in the microcomputer (10). In the first operating state, the microcomputer executes a program which is located in the non-volatile memory (13). In the second operating state, the microcomputer (10) executes a program which is located in the volatile memory (14). The monitoring circuit (12) effects a resetting of the microcomputer (10) whenever it does not receive a monitoring signal for a predetermined time (watchdog timer). The microcomputer is distinguished in that it includes an element for suppressing monitoring signals which are always active whenever the microcomputer (10) is operating in the second operating state.

1 Claim, 5 Drawing Sheets

MICROCOMPUTER WITH THE CAPABILITY OF SUPPRESSING SIGNALS WHICH RESET A WATCHDOG-TIMER

BACKGROUND OF THE INVENTION

The microcomputer according to the invention is based on a microcomputer of the generic type of the main claim. Data Sheet MC 68 F 333 TS/D, Motorola 1992, already discloses a microcomputer which has, apart from the central processing unit, a programmable, non-volatile memory (flash EEPROM), input/output components, a monitoring circuit (watchdog timer), and also a volatile memory (code RAM), into which there can be written program data which can be accessed by the instruction counter of the central processing unit. All the said components are integrated on a chip. The microcomputer is configured such that it can both access program data which are located in the programmable, non-volatile memory and can execute a program which is located in the volatile memory. In both cases, the monitoring circuit is activated, ie. it must be ensured that, in the case of regular program flow, the monitoring circuit is reset at the correct time, since otherwise the monitoring circuit carries out a resetting of the microcomputer. A disadvantage of this microcomputer is that haphazard changes of the memory content in the volatile memory (for example due to interfering EMC radiation) can cause the forming a situation in which the monitoring circuit is reset at the correct time although the program flow is irregular.

SUMMARY OF THE INVENTION

The microcomputer according to the invention having the characterizing features of the main claim has in comparison the advantage that in it there is a separation between execution of a program in the programmable, non-volatile memory (ROM mode) and execution of a program in the volatile memory (RAM mode). The separation is constituted by the fact that resetting of the monitoring circuit is not possible at all in the second operating state (RAM mode). A resetting of the monitoring circuit can take place only in the first operating state (ROM mode). The forming of an EMC radiation-induced program loop in which resetting of the monitoring circuit at the correct time occurs in spite of a disturbed program flow is in this way made more difficult.

It is advantageous on the one hand that the selection of the at least two different operating states of the microcomputer takes place implicitly by a decoding of the address space. As a result, the programming effort is kept low. On the other hand, it is advantageous if the selection of the at least two different operating states takes place by an explicit switching-over of operating modes of the microcomputer. This achieves a more pronounced separation of the two operating states, so that a programmer can keep a better check on the operating states.

Furthermore, it is particularly advantageous that the microcomputer includes a program flow counter. This counter is activated at least whenever the microcomputer is operating in the second operating state (RAM mode). The program flow counter, which in the case of regular program flow is respectively set in a defined way after a certain number of program instructions, makes an additional check on the program flow possible.

It is furthermore advantageous that there are included in the microcomputer means which check the reading of the program flow counter and suppress the emission of monitoring signals if the checking of the program flow counter indicates an irregular program flow. This virtually rules out the forming of an EMC interference-induced program loop in which monitoring signals are emitted at the correct time in spite of irregular program flow.

For simple checking of the reading of the program flow counter, it is advantageous that the microcomputer has a reference counter, which is incremented before each checking of the reading of the program flow counter, that it has means which compare the current counter reading of the program flow counter with the current counter reading of the reference counter and that it detects an irregular program flow if the counter readings of program flow counter and reference counter do not match.

For a simple way of realizing a suppression of monitoring signals it is advisable to provide in the microcomputer a configuration register in which, if there is a change of operating state (from ROM mode to RAM mode), a flag in the configuration register is set, whereby an electronic device is switched in such a way that it blocks the line for the transmission of monitoring signals.

BRIEF DESCRIPTION OF THE DRAWINGS

An exemplary embodiment of the invention is represented in the drawing and explained in more detail in the following description.

DESCRIPTION OF THE INVENTION

Figure 1:
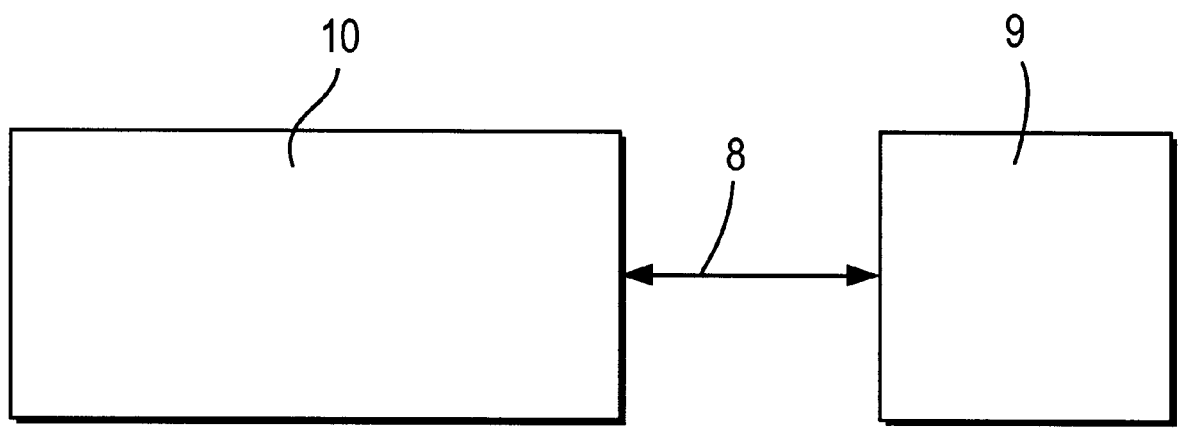
FIG. 1 shows a basic block diagram for an exemplary embodiment of the invention.

In FIG. 1, the reference numeral 10 denotes a microcomputer. Connected to the microcomputer 10 is a development computer 9. The connection between microcomputer 10 and development computer 9 is realized with the aid of a serial data transmission line 8. The exemplary embodiment relates to the field of application of control devices. In this case, the control device is intended to represent an engine control device. For the sake of simplicity, only the microcomputer 10 of the control device is shown. During the application phase of the development of a control device, in particular the optimum program flows for the control device are to be determined. For this purpose, the program flow of the control device is changed, sometimes several times. The effects of the changes are then determined by test runs of the control device. The changes of the program flows relate predominantly to certain program parts of the program flow. Thus, a completely new program does not have to be programmed into the memory of the microcomputer every time. If the control device or the microcomputer of the control device has a code RAM, this code RAM can be advantageously utilized for the application. New programs can namely be written into this code RAM in a simple way, without having to carry out lengthy programming operations of programmable, non-volatile memories. The design of such an engine control device is known per se from the prior art. The engine control device calculates on the basis of input variables of the engine, for example the injection times and also the ignition points for the individual cylinders of the internal-combustion engine. The calculation of these control values takes place by computation algorithms known per se. There are, however, various possibilities for the computation algorithms. To determine here the optimum computation algorithm for the engine, the application system described here is to be used. In optimizing the program flow for the control device, the applicator attempts to find a compromise between the accuracy of the control value calculation on the one hand and the computing time requirement needed for this on the other hand.

To achieve computation results which are as accurate as possible, it is often advisable to use as many parameters as possible of the internal-combustion engine (such as for example speed, engine load, engine temperature, air temperature, battery voltage etc.). On the other hand, the engine load and the speed are sufficient for calculating injection times and ignition points. First control values are often calculated just from these two variables. In order to bring other parameters into the calculation, often just a correction of the previously calculated control values takes place. The exemplary embodiment relates to the correction of the roughly precalculated control values for ignition angles and injection times for the individual cylinders of a six-cylinder internal-combustion engine on the basis of the engine temperature as an additional operating parameter.

Figure 2:
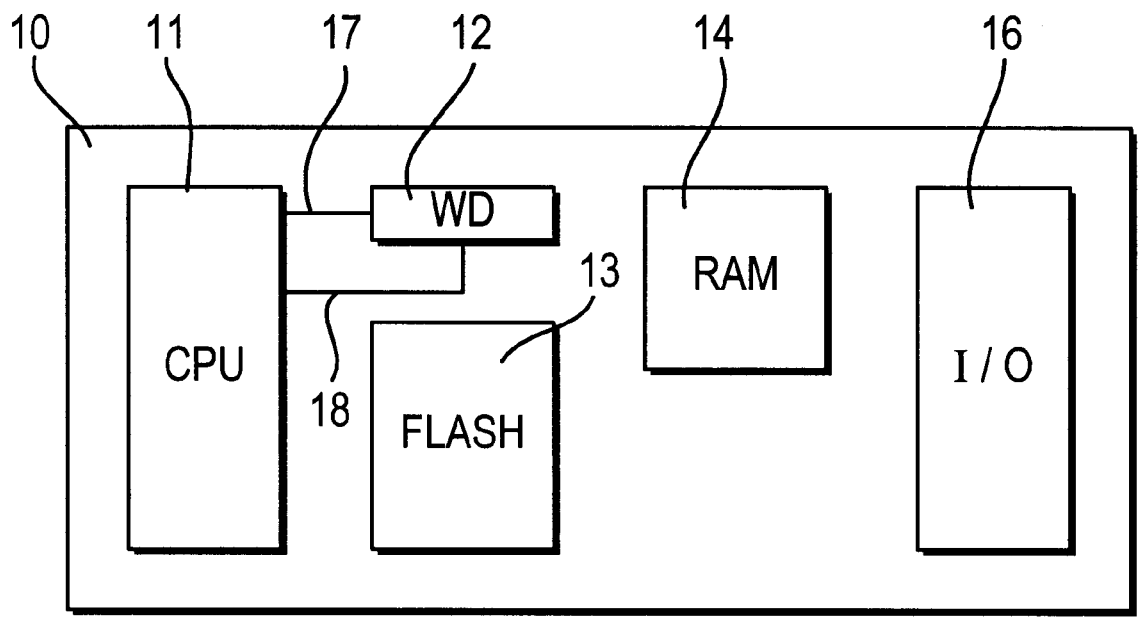
FIG. 2 shows a block diagram of a microcomputer according to the invention.

The microcomputer 10 of the control device has a design such as that represented in FIG. 2. In it, the reference numeral 11 denotes the CPU of the microcomputer. The reference numeral 12 denotes a monitoring circuit, which has also become known in the literature by the term watchdog timer. A programmable, non-volatile memory is denoted by the reference numeral 13. The reference numeral 14 denotes a volatile memory (code RAM), which has as a special feature the option of being configured as a program memory for the CPU 11. Finally, the reference numeral 16 denotes the input/output components of the microcomputer. A serial interface is also intended to be included therein.

Figure 3:
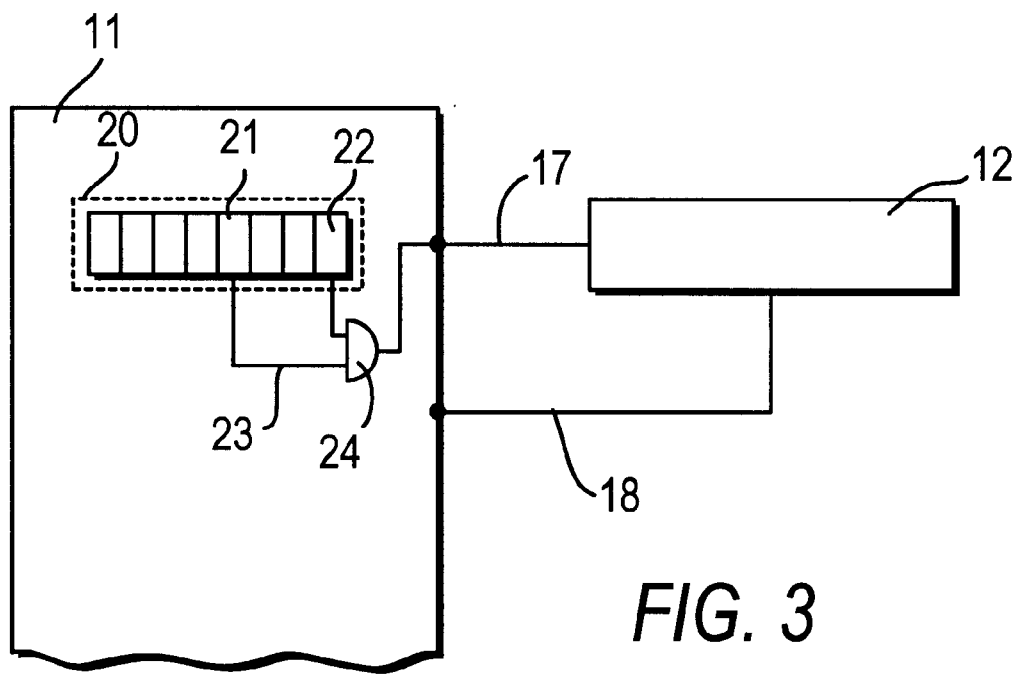
FIG. 3 shows a more detailed cutout of the central processing unit of the microcomputer according to the invention.

FIG. 3 shows a more detailed cutout of the central processing unit 11 of the microcomputer 10. In the central processing unit 11 there is provided a configuration register 20. The configuration register 20 comprises a number of flags. Two flags are particularly highlighted here. The flag 21 is always set whenever the microcomputer 10 is operating in the first operating state (ROM mode), ie. it is executing the program in the non-volatile memory 13. If, on the other hand, the microcomputer is operating in the second operating state (RAM mode), the flag 21 is not set. The status of the flag 21 is passed via a line 23 to a first input of an AND gate 24. The status of the flag 22 is fed to the second input of the AND gate 24. The flag 22 is set only briefly with the aid of a subroutine of the microcomputer 10, namely whenever a monitoring signal is to be emitted to the monitoring circuit 12. This signal can pass to the monitoring circuit 12 only when the flag 21 is set. Otherwise, the AND gate 24 blocks these signals.

In the monitoring circuit 12, a time counter runs up during operation of the microcomputer 10. As soon as this time counter produces an overflow, a resetting of the microcomputer 10 is instigated by the internal logic of the monitoring circuit 12. In FIG. 3, the resetting signal is emitted via the line 18 to the central processing unit 11. The monitoring circuit 12 thus functions in such a way that the internal time counter has to be successively reset before the time counter produces an overflow. Only if this resetting takes place at the correct time does the resetting of the microcomputer 10 not take place. Therefore, the programmer has to take care that, in the case of a regular program flow, resetting of the monitoring circuit 12 at the correct time takes place. For this purpose, the programmer inserts into the program corresponding instructions at defined program points. The program flow in the microcomputer 10 is explained in more detail below with reference to FIGS. 4, 5 and 6.

Figure 4:
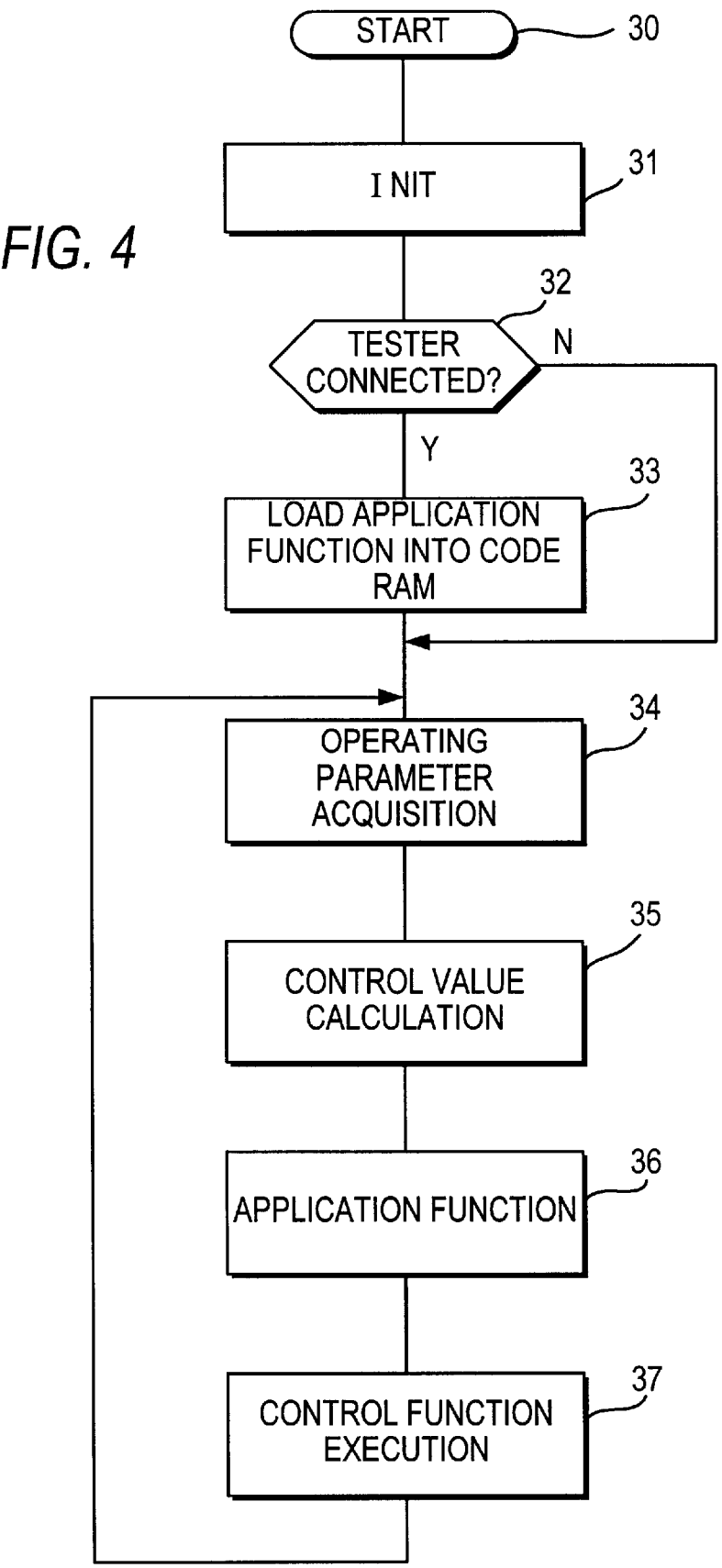
FIG. 4 shows a first structured chart for a program for execution in the microcomputer according to the invention.

In FIG. 4, the reference numeral 30 denotes the program start. After the program start 30, an initialization of the microcomputer 10 takes place in the program step 31. In the interrogation 32, it is interrogated whether the external development computer 9 is connected to the microcomputer 10. If the result of the interrogation is yes, in the program step 33 an application function is loaded into the code RAM 14 of the microcomputer 10. If the development computer 9 was not connected to the microcomputer 10, the program step 33 does not take place. In the program step 34, the operating parameter acquisition for the controlling operation then takes place. In this, the engine speed and engine load are thus determined, inter alia. In the program step 35, the rough control values are calculated on the basis of the acquired operating parameters of engine speed and engine load. In the program step 36, the application function, which was previously loaded into the code RAM 14, is executed. Subsequently, in the program step 37, the control function execution takes place. After that, a first computation cycle has been completed, and the next computation cycle is started with program step 34.

Figure 5:
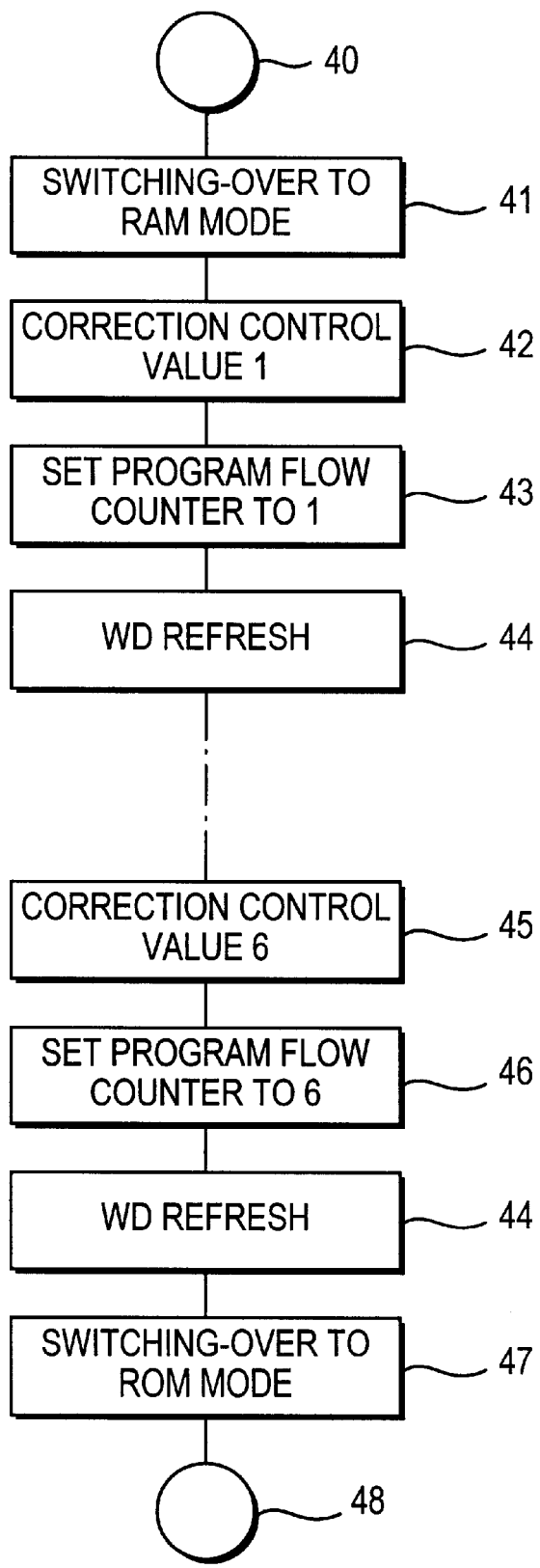
FIG. 5 shows a second structured chart for a program for execution in the microcomputer according to the invention and FIG. 6 shows a third structured chart for a program for execution in the microcomputer according to the invention.

In FIG. 5, a more detailed structured chart of the application function is shown. The call-up of the application function is indicated by the reference numeral 40. First of all, in the program step 41, a switching-over of the operating state (from ROM mode to RAM mode) is then carried out. During this, the flag 21 in the configuration register 20 is reset. Then, in the program step 42, the correction of the first control values (ignition point and injection time for cylinder 1 of the internal-combustion engine) takes place on the basis of the additional application function. After the program step 42, a program flow counter is set to "1" in the program step 43. Subsequently, in the program step 44, the subroutine call-up takes place for the resetting of the monitoring circuit 12. After this subroutine call-up 44, the next action to take place is the correction of the control values 2 (ignition point and injection time for cylinder 2 of the internal-combustion engine). This is not shown in any more detail in FIG. 5, since the program steps 42, 43 and 44 are virtually repeated for this. Therefore, we have dispensed with a separate representation of these program steps. Finally, after the correction of the control values 1–5, the correction of the control values 6 is carried out in the program step 45. After that, in the program step 46, the program flow counter is newly set and, in the program step 44, the subroutine for resetting the monitoring circuit 12 is called up. If this subroutine is correctly executed, the switching-over from RAM mode to ROM mode subsequently takes place in the program step 47. The application function ends with the return 48 to the main program.

Figure 6:
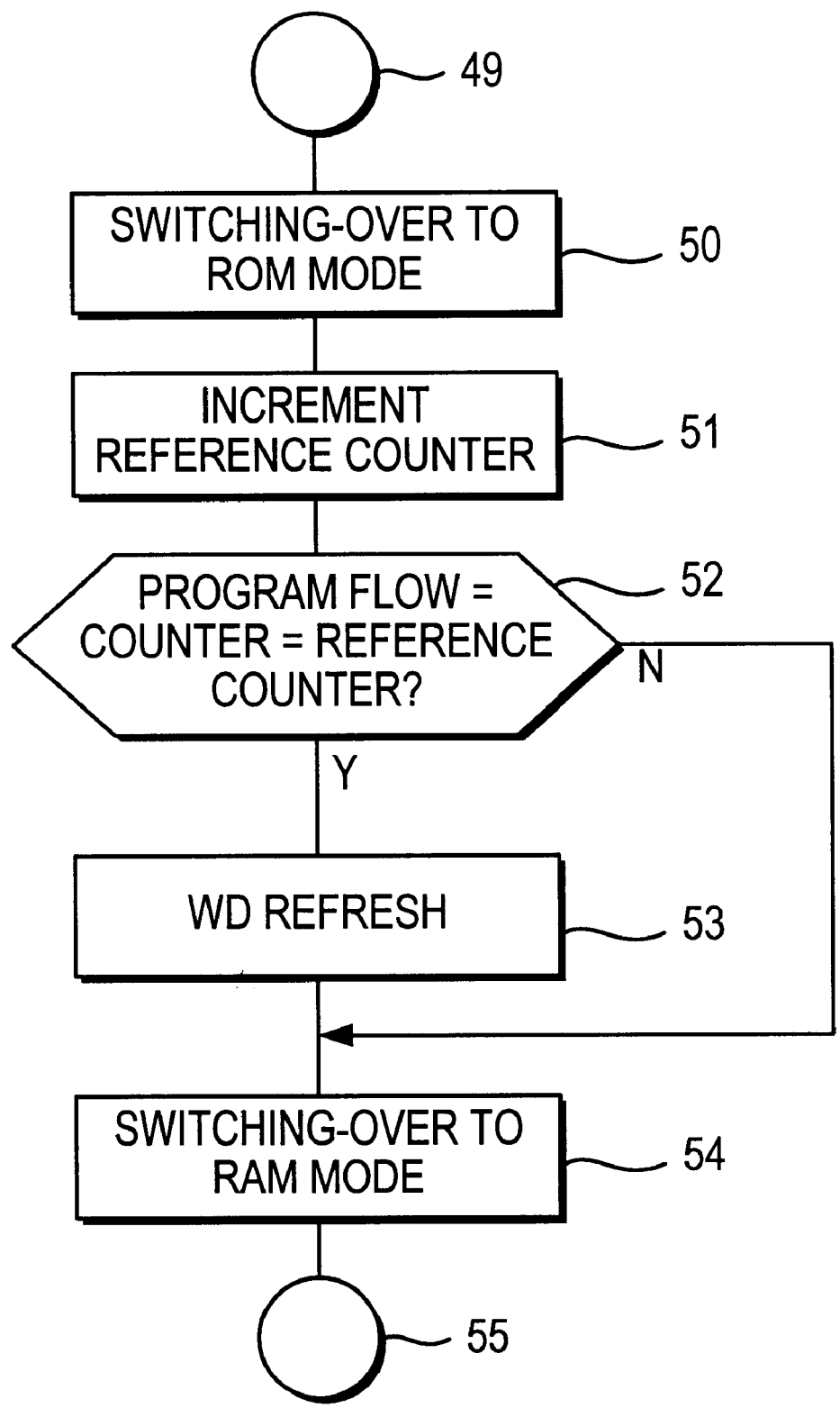

The subroutine which effects the resetting of the monitoring circuit is explained below with reference to FIG. 6. After the call-up of the subroutine 49, a switching-over of the operating state of the microcomputer 10 takes place in the program step 50, to be precise by switching over from RAM mode to ROM mode. In this case, the flag 21 in the configuration register 20 is set. Subsequently, it is checked in interrogation 52 whether the program flow counter is indicating regular program flow. For this purpose, a reference counter is used, which upon call-up of the application function in the program step 36 is set to an initial value and is incremented each time the WD refresh is called up. Then the two counter readings are compared with each other. If the two counter readings do not match, there is an irregular program flow. It is likewise conceivable that an additional time counter is measured here. If the counter reading of the program flow counter has not been changed within certain time limits, it can be concluded that there is a faulty program flow. If regular program flow is detected in interrogation 52, the resetting of the monitoring circuit 12 follows in program step 53. In this case, the flag 22 in the configuration register 20 is set for a certain time and subsequently reset again. The pulse thus produced is passed on via the AND gate 24 and the connection line 17 to the monitoring circuit 12. Subsequently, a renewed switching-over of the operating state of the microcomputer 10, namely from ROM mode back into RAM mode, then takes place in the program step 54. The subroutine for resetting the monitoring circuit 12 is ended with the return 55. If an irregular program flow was detected in interrogation 52, the program step 53 is omitted, so that no resetting of the monitoring circuit 12 takes place. After a short time, the monitoring circuit 12 will then completely reset the microcomputer 10, in order to bring about a reliable state.

The microcomputer 10 according to the invention offers not only advantages for the application of motor vehicle control devices. The reliable operation of the microcomputer is always ensured whenever the microcomputer is executing a program which is located in the code RAM 14 of the microcomputer 10. A further application example of this is the programming of the internal programmable, non-volatile memory 13. The code RAM 14 is also utilized for this. In the code RAM there is then stored the programming algorithm. The data to be programmed are transferred from a connected external programming device to the microcomputer 10. Should the obligation to leave RAM mode within certain cycles be disruptive, a stopping of the monitoring circuit 12 could be provided by additional hardware measures. For example, the monitoring circuit 12 could be stopped by means of the separate programming pin during the programming of the programmable, non-volatile memory 13 (EEPROM) in RAM mode.

It is not absolutely necessary for the invention that the individual components of the microcomputer are integrated on one chip. They may also be accommodated on separate chips.

It is also not absolutely necessary for the invention that a switching-over of the operating states is explicitly provided in the microcomputer 10. The distinction between the operating states may also take place implicitly, for example by address decoding.

Furthermore, when an irregular program flow is detected according to the program step 52, alternatively a resetting of the microcomputer 10 could also be directly initiated.

What is claimed is:

1. A microcomputer, comprising a central processing unit; a non-volatile memory and a volatile memory usable as a program memories, so that programs executable by said central processing unit are readable into said memories; input/output unit; a monitoring circuit effecting a resetting of the microcomputer when it does not receive any monitoring signal for a predetermined time, the microcomputer operating in at least two different operating states so as to execute a program in said volatile memory in a second operating state; and means for suppressing monitoring signals which are active if the microcomputer is operating in said second operating state; and means for switching the microcomputer from time to time from said second operating state to said first operating state in which outputting of the monitoring signals is not suppressed and then a monitoring signal is outputted.

* * * * *